United States Patent [19]
Pujol

[11] Patent Number: 4,723,798
[45] Date of Patent: Feb. 9, 1988

[54] AUTOMATIC MACHINES FOR TYING VARIOUS TYPES OF SAUSAGES

[75] Inventor: Yves Pujol, Albi, France

[73] Assignee: Etablissements Charles freres et cie Societe Anonyme, France

[21] Appl. No.: 922,566

[22] Filed: Oct. 24, 1986

[30] Foreign Application Priority Data

Oct. 24, 1985 [FR] France .................. 85 16248

[51] Int. Cl.⁴ .................. A22C 11/12; B65B 19/34
[52] U.S. Cl. .................. 289/2; 289/18.1
[58] Field of Search .................. 289/2, 18.1

[56] References Cited

U.S. PATENT DOCUMENTS

| | | | |
|---|---|---|---|
| 2,677,487 | 5/1954 | Friedman | 289/18.1 X |
| 3,318,623 | 5/1967 | Barroso | 289/18.1 X |
| 3,940,169 | 2/1976 | Kock | 289/18.1 X |
| 4,313,630 | 2/1982 | Barroso | 289/18.1 X |
| 4,525,002 | 6/1985 | Herubel | 289/2 |
| 4,533,164 | 8/1985 | Barroso | 289/2 |

*Primary Examiner*—Louis K. Rimrodt
*Attorney, Agent, or Firm*—Eric P. Schellin

[57] ABSTRACT

This machine incorporates facilities, mounted on a suitably constructed baseframe (1), for simultaneous formation of "n" ties on continuously-fed products by means of devices corresponding to the number of ties to be made, the formation of ties and their placement on the products being effected to a pre-determined cycle in a sequential manner taking each tie in turn, thread feed control mechanisms (42, 40, 41, 39) (38-1, 38-2), thread tensioning devices (37a, 37b, 37c, 28, 34a, 34b, 34c), additional knot-tightening devices (46a, 47a, 48a, 46b, 47b, 48b), thread presentation devices (4, 3a, 3), particular arrangements for deflection of the thread trajectory at the knotting head (8a, 9a, 10a) (8b, 9b, 10b), (8c, 9c, 10c), features for combined and individual control of the various mechanisms for tie formations and movement of the product-handling devices, the above features and mechanisms providing fully automated fabrication of "n" ties on the abovementioned products.

16 Claims, 12 Drawing Figures

AUTOMATIC MACHINES FOR TYING VARIOUS TYPES OF SAUSAGES

The invention relates to improvements to automatic machines for tying various types of sausages and related products by means of thread, string or similar materials.

It will be recalled that the ends of sausages and related products are knotted by means of thread, string or similar tying materials both in order to hold the contents securely inside the casing or skin and also in order to provide a range of different marketable products, i.e. the sausages may be presented singly or in strings, with the tye-string cut at each knot, or at intervals of two, three, four knots, etc.

An automatic machine operating without manual operator intervention is able to combine the action of cutting strings of sausages and related products to the required length with the knotting or tying function, such as a machine being described in the European Patent Application published under the reference No. 0080422. This machine is operated by the applicant who is therefore fully conversant with its characteristics.

Referring to this Patent Application, it is seen that the machine incorporates automatic features for forming the knot, in this case a fisherman's knot termed the capstan knot, and placement of the tie or ligature on the end of the product. To facilitate sequential tying of both ends of the product, use is made of a movable loading plate which presents each end of the product successively inside the preformed tie.

These arrangements function satisfactorily. However, it should be noted that the ties are made one after another and that the output of the machine, whilst far superior to previous methods, is limited by the operating time of the mechanism.

The problem posed was therefore to find a satisfactory arrangement whereby several ties could be made within the same operating cycle, providing two, three, four, or "n" ties on a number of different products.

This presented numerous technical problems, notably with regard to the simultaneous formation of several ties, pick-up and tensioning of the thread, and tightening of the ties on several products. In particular, at this stage in the operating cycle, it was necessary to devise a means of retaining slack ends between two tying points and of eliminating these on final tightening. The improvements made as described in the invention have provided a solution to the problems posed and, on the basis of a number of new and original features, the output of the automatic machine is greatly enhanced with a high degree of reliability.

The first distinctive feature of th invention relates to improvements in automatic machines for tying various types of sausages and related products by means of thread, string or similar materials, which notably include:—a mechanism controlling the feeding and distribution of thread, a mechanism for tensioning the thread and reeling out the thread to the lacing point on a controlled rectilinear path facilitating tie formation,—a mechanism designed to produce pre-formed ties by a series of deflections of the thread path in several directions relative to the initial rectilinear path, for the purpose of tying the products by means of a knot referred to as the 'capstan' knot, a mechanism designed to pick up and position the product within the tying zone by means of a controlled traverse movement perpendicular to the initial rectilinear path of the thread, a mechanism for placement of the tie on the product, a mechanism for tightening the knot after the tie has been placed on the product.

The improvements are notable in that the machine incorporates:

means for: simultaneous formation of 'n' ties or ligatures on continuous-feed products using a number of mechanisms corresponding to the number of ties to be made, tie formation and placement on the products being effected on a predetermined progressive cycle, ligature by ligature;

thread feed control mechanisms;

thread tensioning mechanisms;

final knot tightening mechanisms;

thread presentation mechanisms;

particular arrangements for deflection of the reeling path of the threads at the knotting heads;

combined and individual controls for the various mechanisms required for tie-formation and movement of the product-handling devices;

the above features and mechanisms providing fully automated fabrication of 'n' ties on the abovementioned products.

These distinctive features will emerge clearly from the description given below.

The object of the invention is described and illustrated, but not limited, by the figures in the drawings in which.

Figure 1:
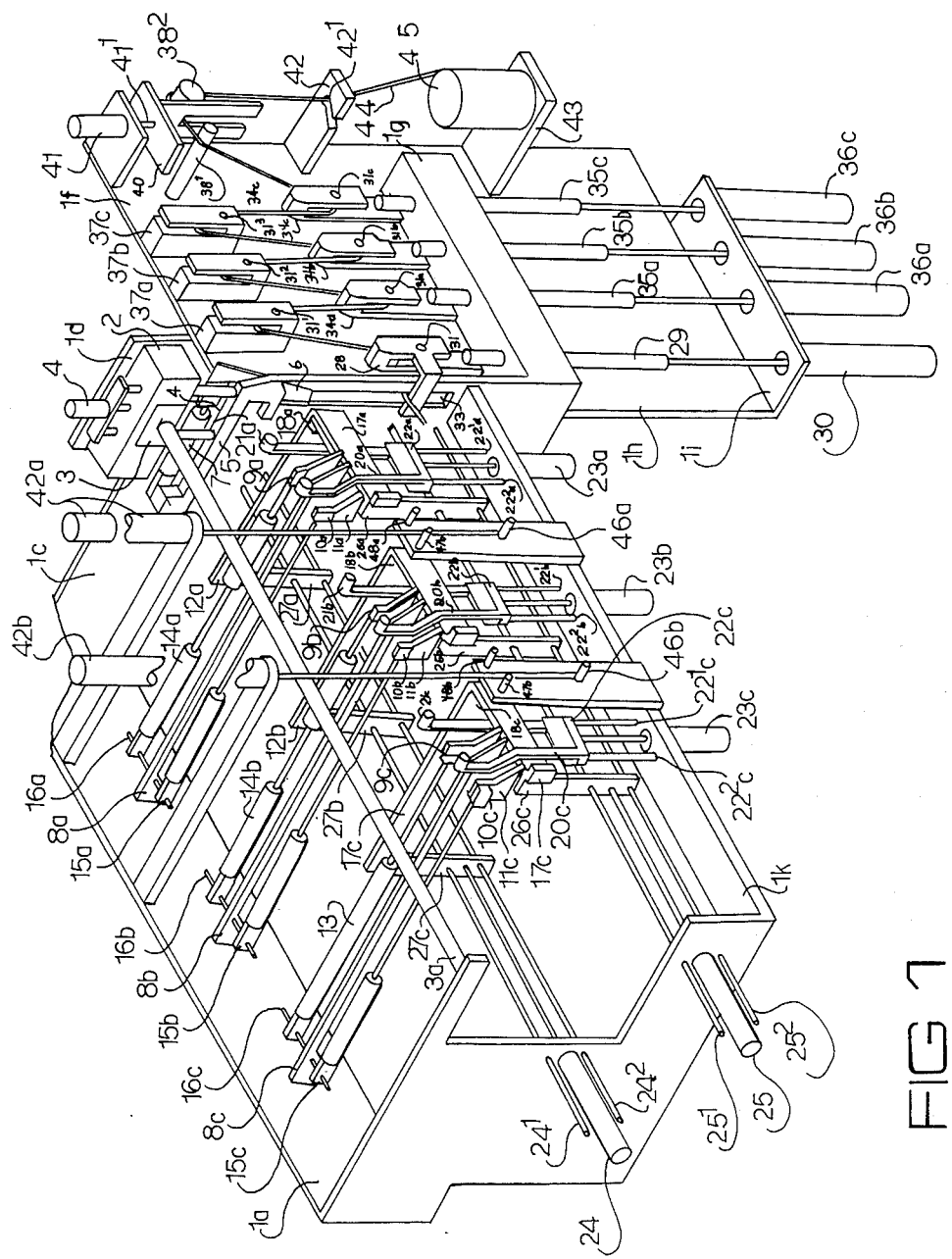
FIG. 1 is a perspective view in the 'at rest' position of the multiple-tie forming mechanisms, 3 ties for example, together with the clamping device.

In order to define the object of the invention more specifically, it is described below in a non-limitative manner illustrated with reference to the figures in the drawings.

First, it should be noted that the improvements described are integral with and/or additional to certain mechanisms described and illustrated in European Patent Application No. 0080422. Moreover, in order that the nature of the improvements is made as comprehensible as possible in the description which follows, reference will be made as necessary to parts described and illustrated in the figures and text of the said European Patent Application No. 0080422. However, certain mechanisms described in the European Patent Application are arranged in a particular manner to suit the specific operational requirements of the machine described in the present application. Furthermore, certain mechanisms have been omitted to aid the clarity of the drawings, such as the mechanisms for loading and presenting the products in the tying area, product cutting devices and the thread cutting tool.

Figure 2:
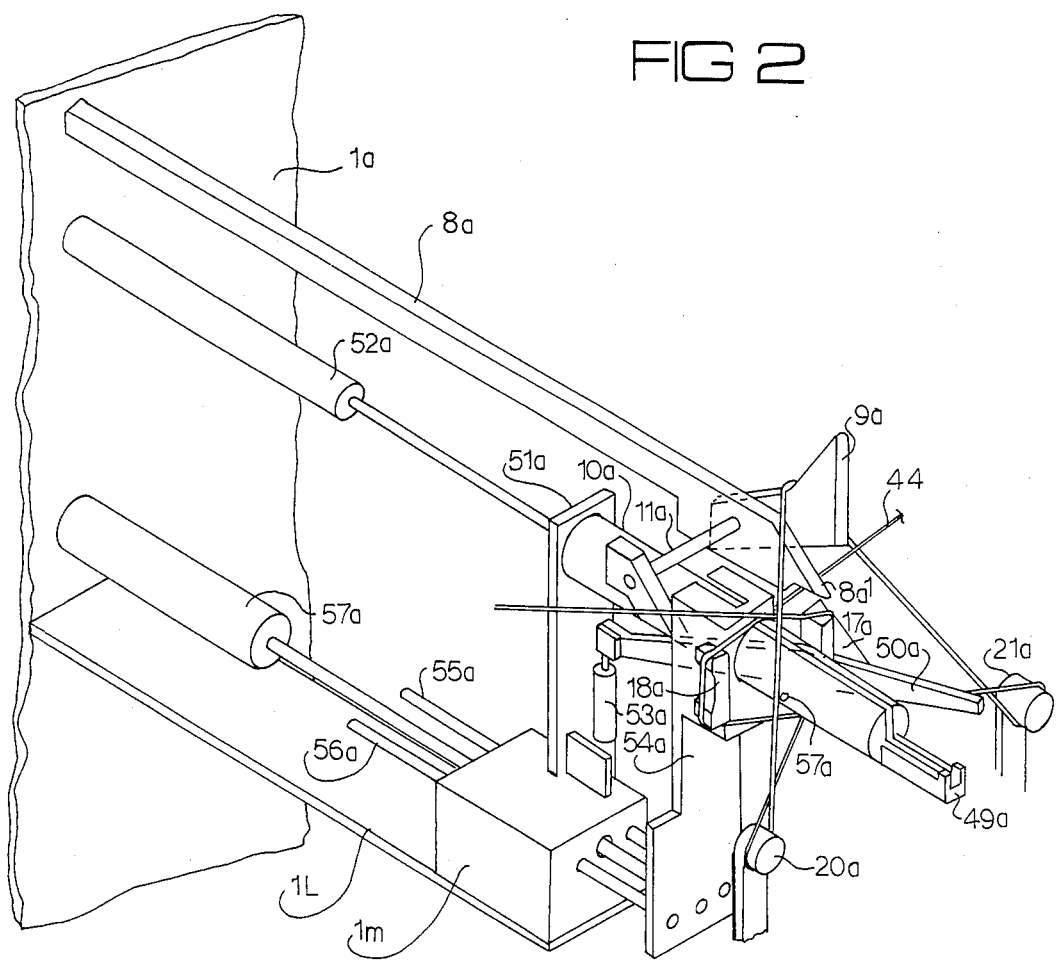
FIG. 2 is a large-scale view showing a knotting head assembly.

Also, certain mechanisms have been omitted from FIGS. 1 and 2 for the sake of clarity, but in each case the position of the missing devices can be readily identified with reference to the position of the other mechanisms and the functional description given.

The whole of the machinery is mounted on a support frame (1) of which the various components provide support or guidance for the mechanisms and are referenced 1a, 1b, 1c, 1d, 1e, 1f, 1g, 1h, 1i, 1j, 1k, 1l, 1m.

The mechanisms thus supported or guided are principally the following:

the thread distribution device which participates in the knot tightening function, the device for presenting the thread at the knotting head assemblies, the knotting heads for fabrication or formation of the knot, this being a fisherman's or 'capstan' knot, the product pick-up and holding assemblies, which also serve to place the knot on the product being tied, a device for final tightening of each knot.

Referring now to FIG. 1, the machinery will be described from the right-hand side of the drawing through the operation sequence of the machine. The frame (1) is first set up with vertical or horizontal surfaces extended or retracted, with side walls as illustrated in the drawings, so that after setting up the various mechanisms the tying thread will assume a rectilinear path. The thread feed mechanism is located at the end of the frame. The thread (44) runs off a reel (45) or bobbin supported on a reel-holder (43) mounted on and fixed perpendicular to the frame wall. The thread (44) is introduced and guided into a notched aperture (42-1) formed in a plate (42) located above the reel holder. The thread is then introduced into the first threadclamping mechanism located at a level above plate (42). This first thread clamping mechanism incorporates a plate (40) connected at the top to the rod (41-1) of a cylinder (41); the cylinder is mounted vertically and fixed to a mounting plate (39) integral with the wall (1f) of the frame (1). The bottom of the plate (40) is arranged in the shape of a fork (40-1). On either side of the fork are located two cylinders (38-1) and (38-2) fixed to the surface (1f) of the frame in a position between the plate (42) and plate (40). The two cylinders (38-1) and (38-2) are placed at the same height, but cylinder (38-2) has a larger diameter than the other, which is a distinctive feature. The thread (44) passes over cylinder (38-2) and enters the fork (40-1) before thread (44) passes over cylinder (38-2) and enters the fork (40-1) before passing over the second cylinder (38-1) towards the thread tensioning mechanism described later. It may be readily appreciated that when the cylinder (41) is actuated downward, the plate (40) will press the thread (44) against the upper generatrix of cylinder (38-2), thereby creating a braking action when the thread is being reeled out. This initial braking action is accentuated by the deflections of the thread path created by the fork (40-1) and cylinder (38-1). This arrangement constitutes an improvement on the thread feed device described in European Patent Application No. 0080422 and contributes to the overal operation of the machine described in the invention. A further characteristic feature of the invention lies in the development of a thread tensioning and distribution mechanism located between the thread-feed device and the device which presents the thread to the knotting heads. The tensioning device is illustrated in FIG. 1 in the 'at rest' position, and also in FIGS. 3, 4, and 5 with reference to a machine set up to execute three simultaneous ties in a non-limitative embodiment, and also in FIGS. 6 to 9 showing the particular construction of each part of the assembly.

With reference to the three-tie configuration, the device consists of three fixed elements (37a, 37b, 37c) attached to the frame, and four vertically mobile elements (28, 34a, 34b, 34c). Generally speaking, there is the same number 'n' of fixed elements as knotting heads and 'n+1' mobile elements. These elements serve to control the thread movement during the formation of each tie or knot and to tighten the knots at the appropriate time. Also, the additional mobile element (28) performs a third function of directing the thread onto the second tightening mechanism which is designed to run the thread in front of the knotting heads.

Referring to FIG. 1, the mobile elements (28), (34a), (34b) and (34c) are actuated by the guide rods (29) (35a, 35b, 35c) of the cylinders (30), (36a, 36b, 36c) fixed to the bracket (1i) perpendicular to the wall (1h) of the frame forming an extension to the part (1F) of the walls of the said frame. In addition, a block (1g) is mounted and fixed on the said walls (1h) of the frame at a higher level than the bracket (1i). This block (1g) incorporates openings to accomodate and guide the cylinder rods associated with the mobile tensioning members (28-34a-34b-34c).

Furthermore, the fixed members (37a, 37b, 37c) are arranged with a small space between them to provide clearance for the mobile tensioning members when these are in the raised position, and a positional offset is thus provided between the fixed members and the mobile members.

As can be seen in FIG. 1, the thread (44) is guided on a precise path from the thread feed mechanism alternately from a mobile tensioning member to a fixed tensioning member and in the example illustrated passes successively through the elements (34c, 37c, 34b, 34a, 37a and 28).

Figures 6, 7:
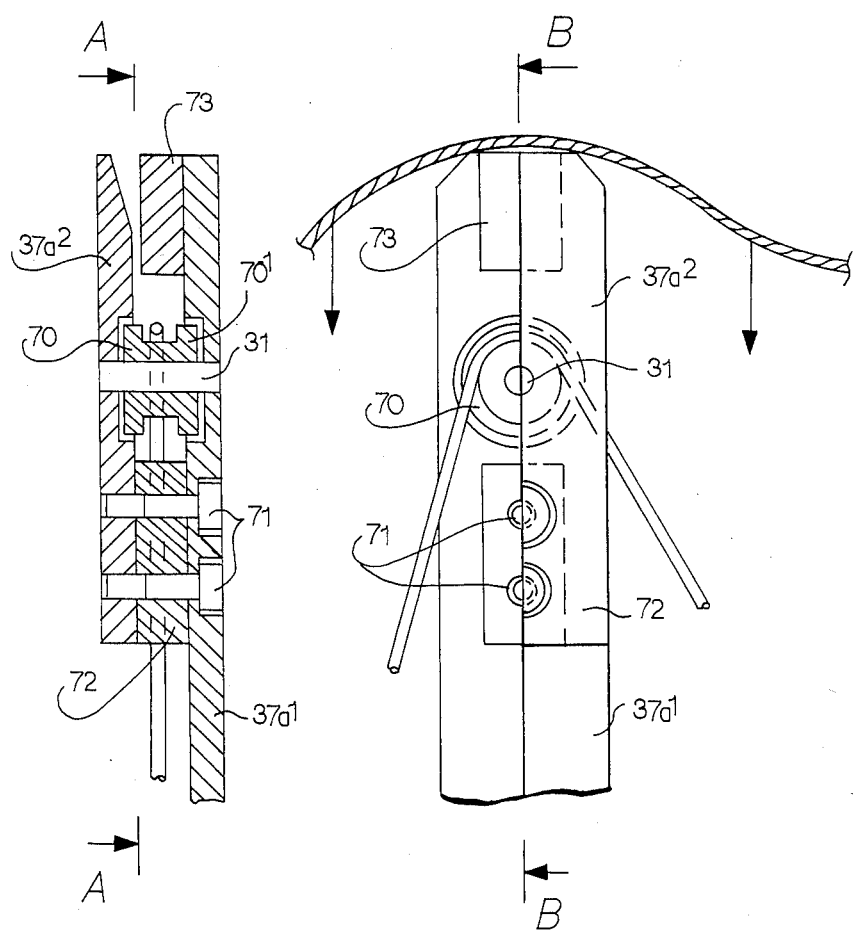
FIG. 6 is a sectional view on B—B in FIG. 7 of one of the fixed-position clamping assemblies on the thread feed device of the machine.
FIG. 7 is a part sectional view AA in FIG. 6.
Figures 8, 9:
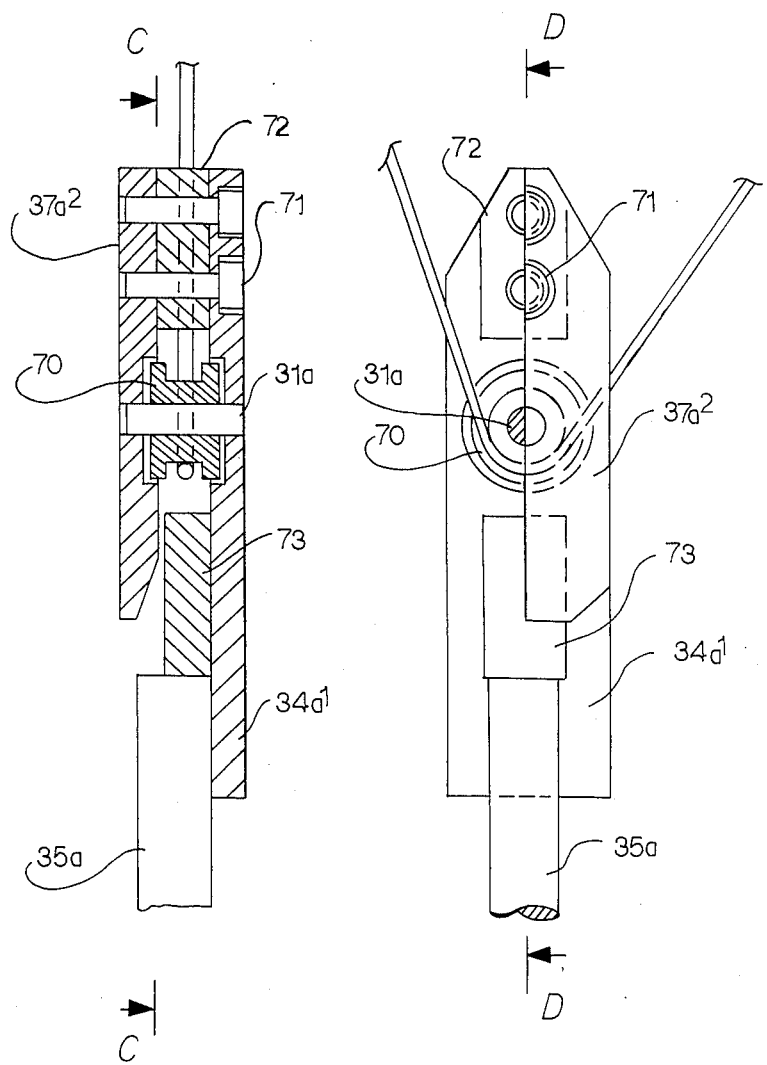
FIG. 8 is a sectional view on DD in FIG. 9 of the mobile-position clamping assembly on the thread feeding device of the machine.
FIG. 9 is a part sectional view BB in FIG. 8.

Refer now to FIGS. 1, 6 and 9 for a description of the construction of each tensioning member.

Each fixed tensioner (37a, 37b, 37c) and the mobile tension members (34a, 34b, 34c) is constructed in the form of a yoke with apertures facing upwards and downwards respectively and are designed to accomodate a idle pulley (70) mounted on the pivot pins (31-1, 31-2, 31-3) and (31a, 31b, 31c). To ensure proper retention of the thread and to prevent it from inadvertently running off the pulley, the tensioners may be arranged in a particular manner. The description given below relates to one fixed tensioner and one mobile tensioner, the others being of similar construction. Each member incorporates a flange (37a1) and (34a1) which is fixed either to the machine frame (1f) or to the guide rod (35a) associated with the cylinder (36a). A second flange (37a2) (34a2) is rigidly attached to the above flange by screw type fixings (71) or equivalent; a spacer (72) designed to hold the flanges apart, is located at the bottom connecting area. The pivot pin (31-1) (31a) for the idler pulley is mounted above this. This pivot pin is a fixed assembly. The pulley cheeks (70-1) are conveniently set into recesses in the flanges to provide secure holding of the thread. At the top of each tensioner a stop (73) is mounted on the flange (37a1-34a1) whilst the opposite face of the other flange (37a2) (34a2) is bevelled to facilitate introduction of the thread. This arrangement offers a number of advantages, including:

the strain imposed on the thread is reduced by virtue of the rolling action of the pulley on the pivot pin;—ease of introduction of the thread;

impossibility of jamming of the thread between the pulley and casing;

virtual impossibility of accidental run-off of the thread by reason of the stops at the entry point into the casings.

As indicated above, the mobile tensioner (28) which performs the third function of directing the thread to the second thread-tightening mechanism, is constructed quite differently from the other elements (34a, 34b, 34c) incorporating a square extension piece forming a lug (32) which is able to slide along a vertical slot (33) in the frame support (1c) as element (28) is raised or lowered. The support (1c) is mounted in a plane perpendicular to the mounting surface (1F) on which the above fixed and mobile tensioners are placed. As shown on FIG. 1, the thread is first guided through the various tensioning members, slides onto the part of tension element (28), enters the slot (33) and is applied against the lug (32) on the tension member (28). Thus, when the lug is in the raised position, it positions the thread between the jaws (5) and (6) of the thread clamp actuated by a cylinder (7). This thread clamp has been described in European Patent Application No. 80422.

In a new feature of the invention, the thread clamp device has a double traverse and vertical movement. More precisely, the thread clamp is mounted on two guide rods (4-1) guided in a block (2) by means of a cylinder (4). Operation of this cylinder (4) thus causes the thread clamp to move in the vertical plane. This arrangement is particularly important as it enables the thread or string to be aligned on the generatrix line of the knotting zone, as will be described below.

Furthermore, the block (2) is also associated with the moving part (3) of a rodless cylinder which slides on the cylinder tube (3a). The tube is fixed at one end to the frame support face (1b) and at the other to the frame support surface (1d).

Other equivalent means may be employed for this purpose, provided that the principle of horizontal movement of the thread clamp device in the raised position at the knotting heads is retained in the tie-formation process.

Let us now refer to and describe the knotting heads which are mounted in the lateral extension in relation to the tensioning members.

In a typical non-limitative example, three knotting heads are used. These are mounted in relation to the rear support surface (1a) of the frame connecting the side surfaces (1b) and (1c) and face forwards. More precisely, the knotting heads each incorporate a support member (8a, 8b, 8c) respectively, of which the read end is fixed to the support surface (1a) of the frame, and the forward end (8a1, 8b1, 8c1) is bevelled and forms a fixed finger of which the function will be described below.

The abovementioned support members (8a, 8b, 8c) incorporate apertures at front and back forming bearings for the engagement of pins extending externally on either side of the members, respectively (16a, 16b, 16c) and (11a, 11b, 11c). With reference to FIG. 1, mobile fingers (9a, 9b, 9c) and (10a, 10b, 10c) are mounted and pivot on the pins (11a, 11b, 11c) on both sides of each support member (8a, 8b, 8c). The front of these fingers have a sloping profile identical to that of the support members and are pivoted at the rear, and above their pivot pins (11a, 11b, 11c) associated with the cylinder rods (14a-12a) (14b-12b) (13) and also (15a, 15b, 15c) located on either side of support members (8a, 8b, 8c) and fixed on the rotation pins (16a, 16b, 16c). As can be seen, these fingers are subject to an upward swinging motion which will be described below. The surfaces of the sloping profile of the fingers are cylindrical in shape to facilitate sliding of the thread. In a very specific manner which will be described in detail in the description of the machine operating cycle, the fingers (10a, 10b, 10c) and (9c) are actuated by a single cylinder respectively (15a) (15b) (15c) (13) which places the cylinder in one of two positions—raised or lowered—when the cylinder rod is extended or retracted.

Fingers (9a, 9b) are actuated by a set of two cylinders mounted in series respectively (14a, 12a) and (14b, 12b), which places the finger in one of three positions—raised, intermediate or lowered—when the appropriate cylinder rods are successively extended or retracted. The total travel of the fingers is the same in all cases.

Generally speaking, in the case where the machine has 'n' knotting heads, the fingers (9a) to (9 (n-1)) have three positions and finger (9n) has only two positions by analogy with finger (9c) in the example illustrated.

Let us now describe the other features of the tie-forming mechanism which have an arrangement based on European Patent Application No. 80422. It will be recalled that, in the said application, tie-formation was achieved by a series of deflections of the thread path with an arrangement of blades acting in a horizontal plane, and fingers acting in a vertical plane. In the abovementioned arrangement, the blades (17a, 17b, 17c) (18a, 18b, 18c) mounted in opposite pairs slide in a horizontal plane under the fingers (9a to 9 (n1), these blades being more or less against each other in the closed position, and are actuated to close or open by means of suitable control devices.

The tip of each blade is turned back to form a hook and are held apart when in the side by side position.

These blades are moved apart transversally to deflect the thread in the initial tie-forming phase. In particular, each group of blades (17a, 17b, 17c) and (18a, 18b, 18c) is associated with a cylinder which actuates these movements. Blades (18a, 18b, 18c) are integral with the end of a vertical anchor plate (26a, 26b, 26c) sliding on guide rods (25-1, 25-2) mounted horizontally between the frame walls (1b) and (1c) and guided in suitable bores. In a similar manner, blades (17a, 17b, 17c) are integral with the end of a square vertical anchor plate (27a, 27b, 27c) sliding on guide rods (24-1, 24-2) mounted between frame walls (1b-1c) and guided in suitable bores. The above anchor plates are traversed along the guide rods by cylinders (24, 25) respectively, of which the rods are fixed to the nearest anchor plate. By operating the cylinders, the blades are moved apart to form a space between the hooked tips of the blades (17a-18a)—(17b-18b)—(17c-18c).

In addition, in order to deflect the line of the thread or string in a vertical plane and downwards, each tie-forming mechanism incorporates a pair of hooks (20-21) integral with the plate (22), and this assembly moves vertically with the aid of actuating cylinders (23). These hooks are mounted opposite each other on the plate so as to locate on either side of the blades (17a-17b-17c-18a-18b-18c). The hooks (21) incorporate a cylindrical boss (21a-21b-21c) and are mounted ahead of the fingers (9a-9b-9c), to the right of the drawing in FIG. 1, and behind the abovementioned blades. The hooks (20) which are profiled with a slight vertical offset, as described in European Patent Application No. 80422, also incorporate a cylindrical boss (20a-20b-20c) and are mounted in a particular manner between the pairs of fingers (8a-10a)—(8b-10b)—(8c-10c).

The assembly travels vertically under the action of cylinders (23a-23b-23c), and guidance is provided by cylindrical rods (22.1a-22.1b), (22.1b-22.2b), (22.1c-22.2c) sliding in apertures formed in a horizontal plate (1k) mounted between the frame walls (1b-1c) of the machine. The cylinders (23) are fixed to the frame by any suitable means.

In an important feature of the machine, provision is made for an additional knot-tightening device between the knotting heads. More specifically, each device is mounted on a vertical support (100a-100b) fixed by any suitable means to the edge of the frame plate (1k). The top part of the support (100a-100b), on either side of the longitudinal axis of the support, incorporates two fixed pins (47a-48b), and a mobile pin (46a) (46b) is arranged to move vertically by means of suitable actuating device. More specifically, this mobile pin, which is associated with the support (100a-100b) by means of a slot and fixing omitted from the illustration, moves in the central median axis between the fixed-position pins. The mobile pin is associated with a cylinder rod (42a-42b) the base of which is fixed to a bracket (61) mounted horizontally off the frame wall (1a) as shown in FIG. 1. The role of this additional knot-tightening device will become apparent in the description of the machine operating cycle.

Referring now to FIG. 2 which illustrates the knotting head assemblies, the product pick-up and holding devices together with the features for placement of the knot after lacing, and for controlling the thread path after the lacing operation.

For the sake of clarity of the drawings, certain items are only partially illustrated, and reference should also be made to FIG. 1 for full details. Each knotting head is provided with a mechanism for picking up and holding the product being tied. This mechanism is located below each support element (8a-8b-8c) for the pairs of fingers (9a-10a), (9b-10b), (9c-10c). More specifically, the product pick-up and holding device is in the form of a clamp (49) incorporating a cylinder body extending into an end tip (49a). An aperture (49) is provided transversely in the cylindrical body of the clamp and this aperture accommodates a pivoted arm or jaw (50a). The jaw is pivoted on a link pin (57c) and connects at the rear end (50b) to a vertically-mounted cylinder rod (53a). The cylinder base is attached to a vertical bracket (51a) the top part of which is integral with the body of the pick-up grab.

When the cylinder rod (53a) is extended, the mobile arm or jaw is held inside the cylindrical body of the pick-up grab. Retraction of the cylinder rod causes the jaws of the grab to open.

In another arrangement, the pick-up grab (50) is actuated by a cylinder (52a) suitably fixed to the frame wall (1a). Note that movement of the grab causes simultaneous movement of the bracket (51) of the cylinder (53) actuating the jaws of the grab.

In addition, the grab body (50) slides in a suitable aperture in the stripper block (54a), under the action of the above cylinder (52a). This block, which extends vertically downwards, also moves forward or back in a reciprocating motion under the action of another cylinder (57a) fixed to the frame wall (1a). The block is guided by the cylindrical rods (55a) (56a) sliding in a block (1m) fixed on the horizontal support (11), which is in turn attached to the vertical wall (1a) of the frame.

Referring now to FIG. 2, it is seen that with the cylinder (57a) in the extended position, the stripper block is located near the space in the tying zone defined by the fingers (9-10), the blades (17-18) and the hooks (20-21).

OPERATION

Figure 3:
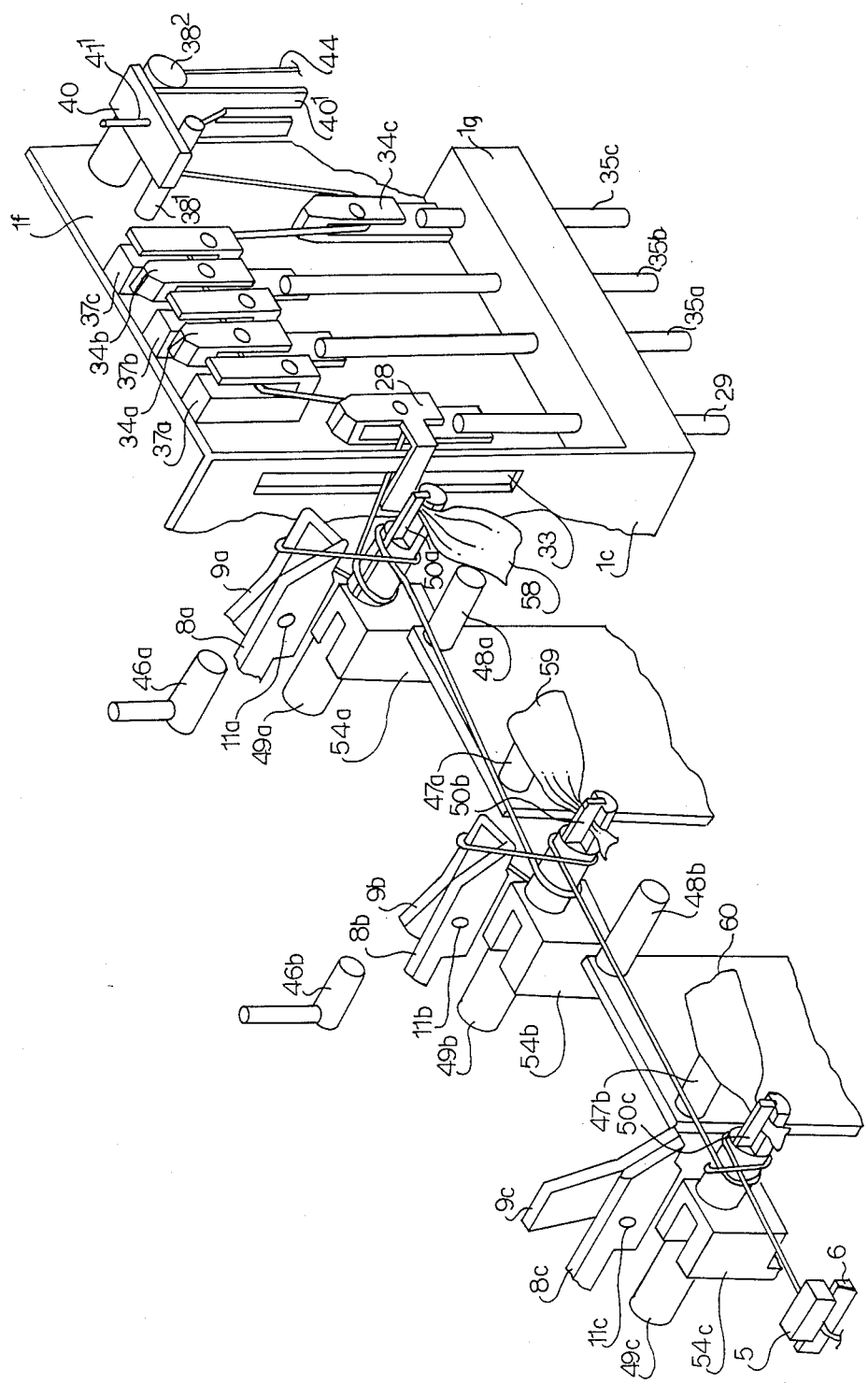
FIGS. 3, 4 and 5 are large-scale perspective views showing simultaneous formation of 3 ties sequenced so as to provide successive tightening of each knot.
Figure 4:
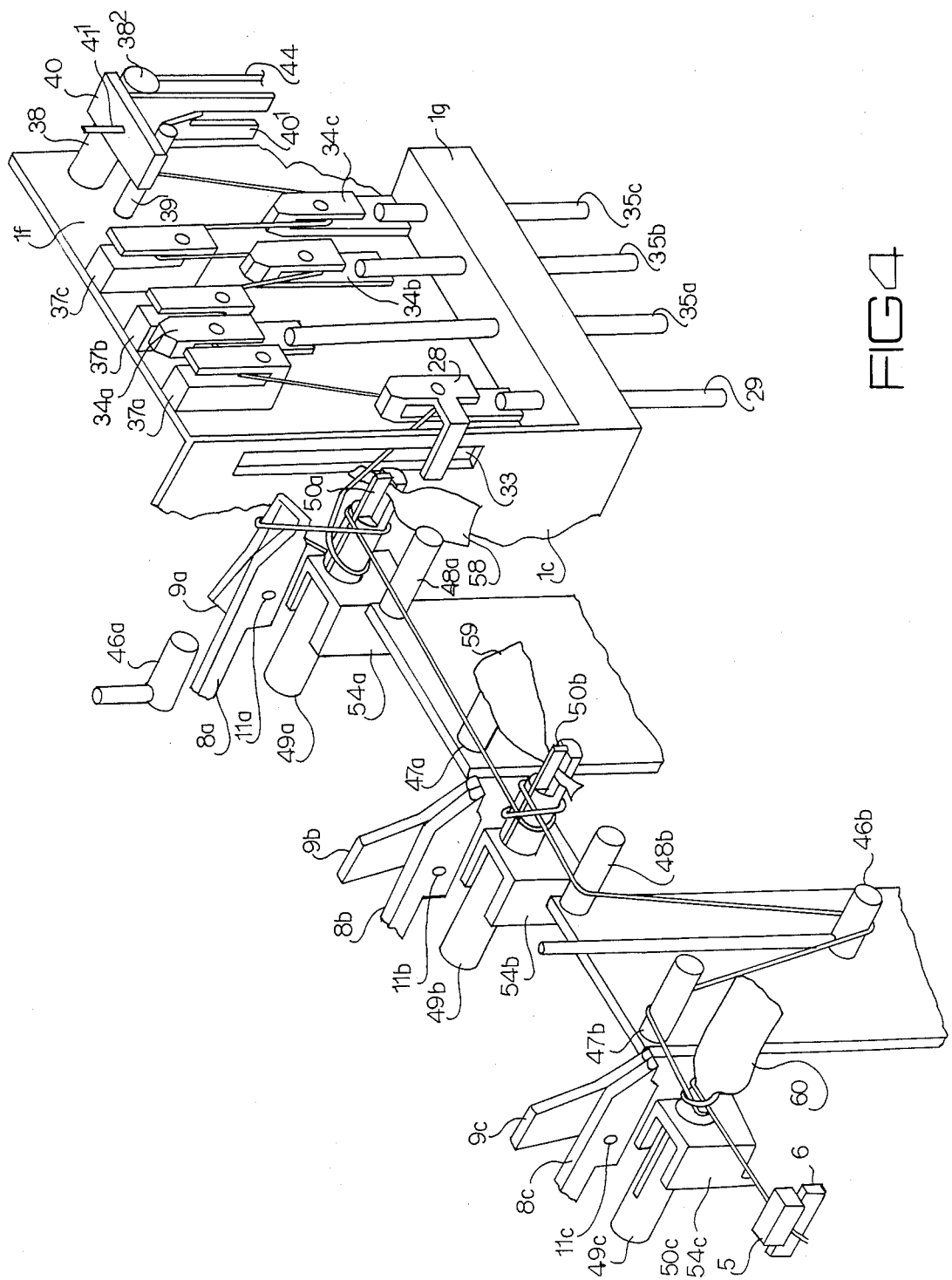
Figure 5:
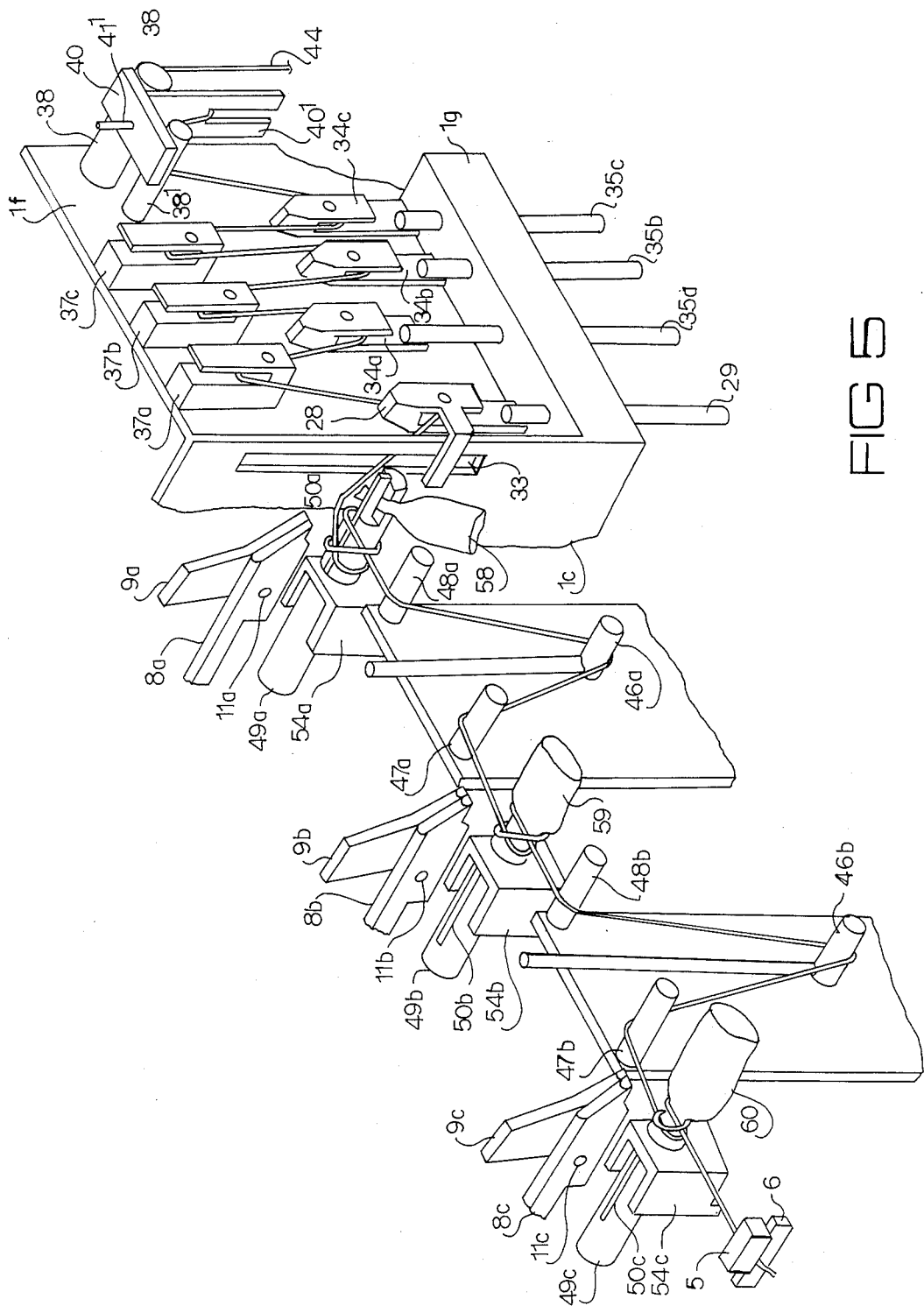

The following is a description of the operating principle of the machine, and reference should be made to the drawings, and in particular to FIGS. 3, 4 and 5 which illustrate the principle well.

At the start of the cycle, the cylinder (41) is at rest, such that the fork (40.1) associated with the plate (40) is not exerting any force on the thread (44) which is thus free. The mobile tensioners (28), (34a-34b,34c) are in the lowered postion. The mobile pins (46a-46b) on the additional knotting device and mounted on supports (100a-100b) are in the raised position. The fingers (9a-9b-9c) and (10a-10b-10c) are all in the lowered position. The hooks and corresponding cylindrical pins (20a-20b-20c) (21a-21b-21c) are also in the raised position. The blades (17a-17b-17c) (18a-18b-18c) are held against each other in the position shown in FIG. 1.

The pick-up grab (49a) (one only illustrated) and the stripper block (one only illustrated) are in the retracted position. The thread clamp device (5-6) is open and in the raised position close to the wall (1d) to the frame.

The operating sequence is as follows:

The mobile tensioner (28) moves to the raised position under the action of cylinder (29). This upward movement raised the thread (44) passing through the slot (33), by means of the lug (32) associated with element (28), and positions the thread between the jaws (5-6) of the thread clamp.

The next stage involves presentation of the thread to the knotting heads.

For this purpose, the cylinder (3) is actuated and moves the thread clamp (5-6) from right to left in FIG. 1, running the thread in a rectilinear direction.

The next stage involves formation of the different ties. More precisely, when the cylinder (3) is at the limit of its travel, the fingers (9a-10a) (9b-10b) are raised into the high position, including fingers (9a-9b). This upward movement picks up and holds the thread and positions the fingers against the hooks supporting the pins (20a-21a) (20b-21b) (20c-21c) so that the length of thread is located under the said pins. The cylinders (23a-23b-23c) are then energised and lower the abovementioned pairs of hooks, thereby pulling the corresponding lengths of thread downwards.

As a result of the top and bottom engagement of the thread by the above devices, and by virtue of the positioning of these devices, the thread is applied against the blades (17a-18a) (17b-18b) (17c-18c). The cylinders (24-25) are then actuated and move the blades relative to each other to produce a suitable space to permit additional formation of the tie. Engagement of the thread is provided by the curved lugs on the abovementioned blades. At this instant, the fingers (10a-10b-10c)

return the lowered position. In parallel with the movement of the blades, the other mobile tension members (34a–34b–34c) are moved into the raised position, freeing the thread (44) and allowing it to slide over the elements. Note the perfect inter-relation between the tie forming mechanisms and the mobile tensioners releasing the lengths of thread required to form the ties. The operations described above are illustrated notably in FIG. 2, which shows one of the tie configurations obtained.

The next phase involves picking up of the products to be tied by the pick-up grabs, and their insertion into the pre-formed ties.

To facilitate comprehension of the drawings, the products to be tied are not illustrated. The ends to which the ties are attached are facing the abovementioned grabs.

Referring to FIG. 2, each pick-up grab (49a) for example is moved forward by the cylinder (52a) and passes through the lacing. In this position, the mobile jaw (50a) on the grab is retracted, then once past the tying zone, the grab opens. Observe that the outward movement of the grabs on each knotting unit is simultaneous.

Referring to FIG. 3, the mobile jaw (50a) on each grab closes on the object to be tied, at its limit of travel.

The next stage involves simultaneous advancement of the stripper blocks (54a–54b–54c). During this movement, the blocks push the thread held on the different pick-up grabs. The finger (9c) is lowered directly by retraction of its actuating cylinder, whilst the fingers (9a–9b) assume an imtermediate position as shown in FIG. 3. Simultaneously with this operation, the first thread-clamp mechanism (40) is activated and the fork (40) holds the thread secure.

Also, two of the mobile tensioners, element (28) and element (34c) are lowered by their respective cylinders, thereby retracting the thread (44). In addition, the thread-clamp (5–6) holding the thread is returned to the low position, i.e. to the level of the centreline of the pick-up devices or cylindrical grabs (49a–49b–49c). By the combined effect of the tensioners (28 and 34c) and movement of the thread-clamp, the tie around the cylindrical grab (49c) closes around the grab, thus forming the knot. However, the other fingers (9a–9b) which are still in the mid position prevent final formation of the knots corresponding to each of the grabs (49a–49b). The thread retains the ability to slide over the aforementioned grabs and fingers. With the first knot formed on the grab (49c), it is then necessary to place it on the corresponding end of the product to be tied. For this purpose, the pick-up grab (49c) is partially suited on the action of its actuating cylinder and retracts into the corresponding stripper block (54c) previously extended. As it retracts, the grab (49c) pulls the product (60) with it, and the product is thus pressed against the said block. Simultaneously, the thread located on the cylindrical block of the pick-up grab is completely withdrawn from the block, the thread is placed on the product (60) to be tied.

It is then necessary to tighten the knot on the product (60). This involves the additional knot-tightening device illustrated in FIG. 1 and 4. The mobile pin (46b) mounted on the plate, which is initially in the raised position, is actuated by the associated cylinder and descends along the wall, taking the thread with it which bears on the edge of the pin. This exerts a pulling action on the thread, thereby tightening the knot. Simultaneously, the finger (9b) on the second knotting mechanism lowers. The mobile tensioners (28) and (34c) are still activated by their respective cylinders, whilst the mobile tensioner (34b) is in turn actuated by its cylinder in the low position pulling the thread. This element does not however travel to its full limit on the downstroke, but retains a degree of travel which is used at the later stage. By this action, the knot around the product (60) is tightened, and a second knot is being formed at another tying point, i.e. in the example illustrated, around the grab (49b). During this operation phase, the finger (9a) remains in the mid position, enabling the thread to slide over the finger and corresponding grab (49a).

Referring to FIG. 5, illustrating the formation of the second knot in a manner similar to the first, it is seen that the pick-up grab is also moved backwards by its cylinder retracting into the corresponding stripper block (54b) and pulling the product (59) with it. In an identical manner, the thread is brought against the said block and as the grab retracts is placed onto the product. The second additional thread-tightening device then comes into play, and the cylinder (42a) drives the mobile pin (45a) downwards from its initial raised position, taking with it the thread which bears upon the outer edge of the pin. Note that the said boss does not complete the full distance of travel on the downstroke for reasons explained below.

In parallel with these operations, the finger (9a) associated with the third tie-formation mechanism assumes the lowered position, and the mobile tensioner (34a) is in turn driven down by the cylinder (36a) over part of its potential travel. In these conditions, the second knot is tightened around the product (59) to be tied. Lowering of the finger (9a) initiates formation of the third knot around the pick-up grab (49a).

The third knot now remains to be completed. This phase is not illustrated in the drawings in the Figures but can be described with reference to be abovementioned figures. The pick-up grab (50a) is driven back by its cylinder and in turn enters the stripper block (54a) pulling the product (58) with it. The thread is then placed on the product in a similar manner.

As described above, the mobile tensioners (34a) (34b) and the pin (46a) are only moved through part of their available travel. Tightening of the third knot enables this remaining capacity to be used and the tensioners and pins then reach their ultimate down position.

In the example illustrated, when the three knots have been completed, the mechanisms revert to their initial position. In particular, the pins (46a) (46b) associated with the additional knot-tightening mechanism return to their initial raised position, the thread-clamp (5–6) opens and assumes the raised position whilst the said thread-clamp is returned to its initial position near the wall (1c) by the action of the actuating cylinder (3). Also, the pick-up grabs open, thereby releasing the tied products. The latter are removed at the next cycle, In so doing, the thread ties the last product and enters the jaws of the thread-clamp. When the thread-clamp is traversed for the next cycle, it ejects the previously tied products whilst at the same time pulling the thread in front of the knotting head. Also, a thread-cutter which is not illustrated, installed downstream of the jaws of the thread-clamp (5–6), separates the string of tied products from the next products in line.

Figure 10:
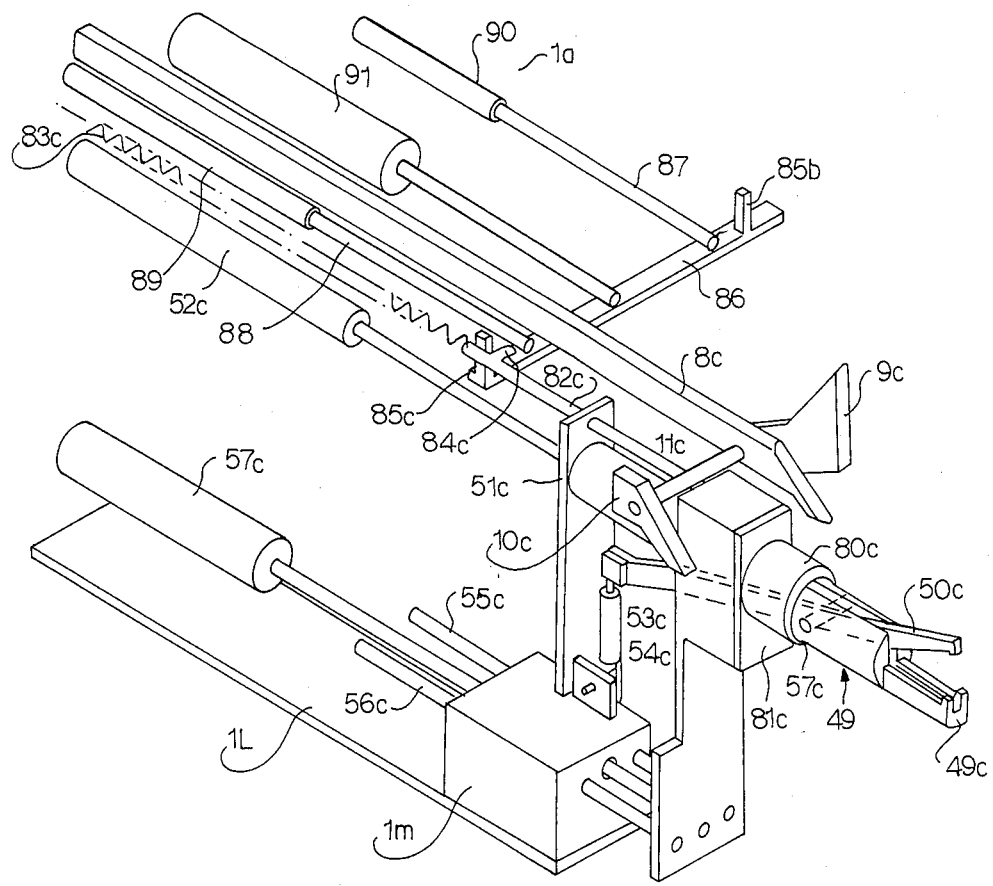
FIG. 10 is a large-scale part perspective view notably showing the mechanisms for knot placement on the ends of the product being tied.
Figure 11:
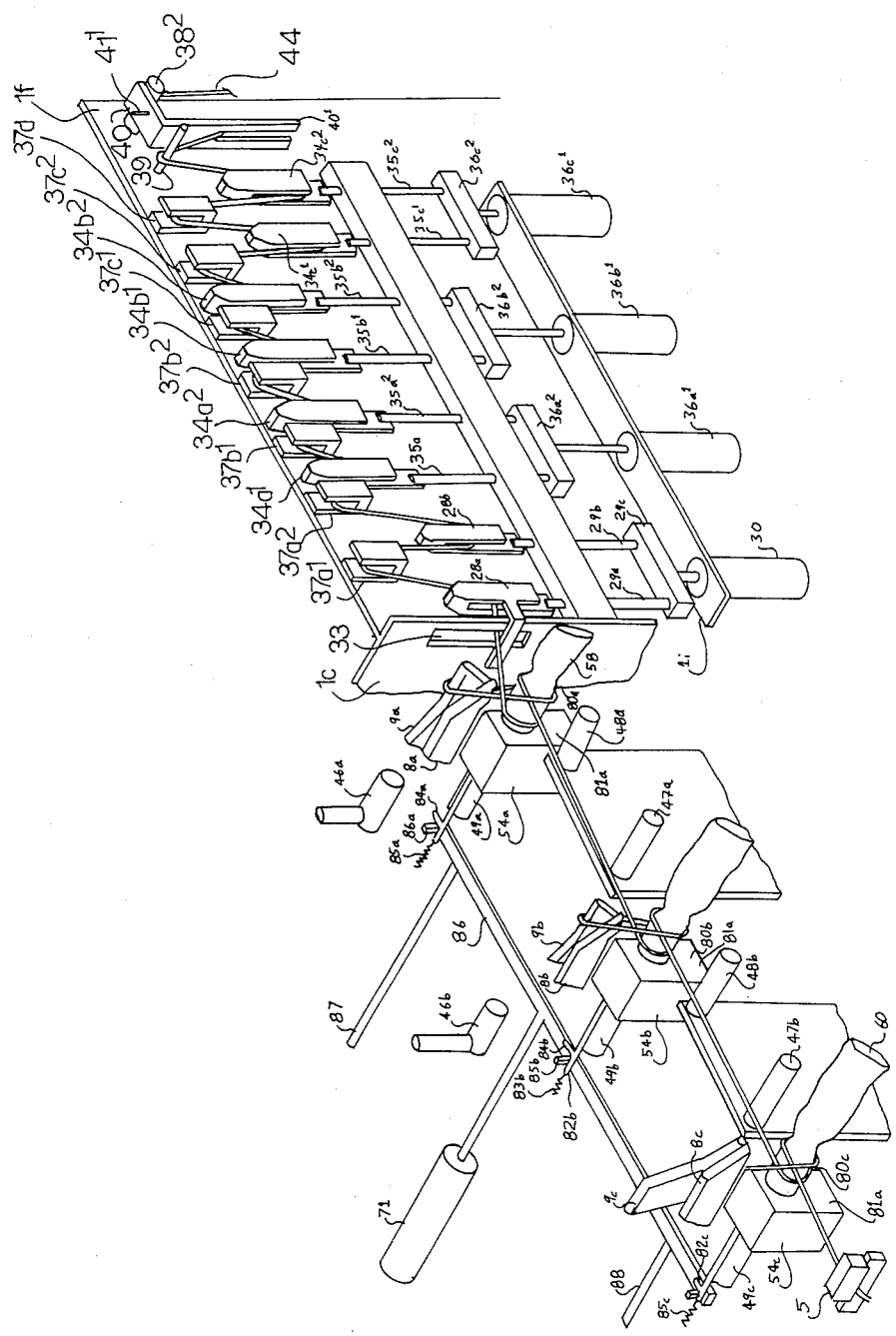
FIG. 11 is a view showing the method of knot placement and duplication of the thread tensioning and distributing mechanisms for knot tightening.
Figure 12:
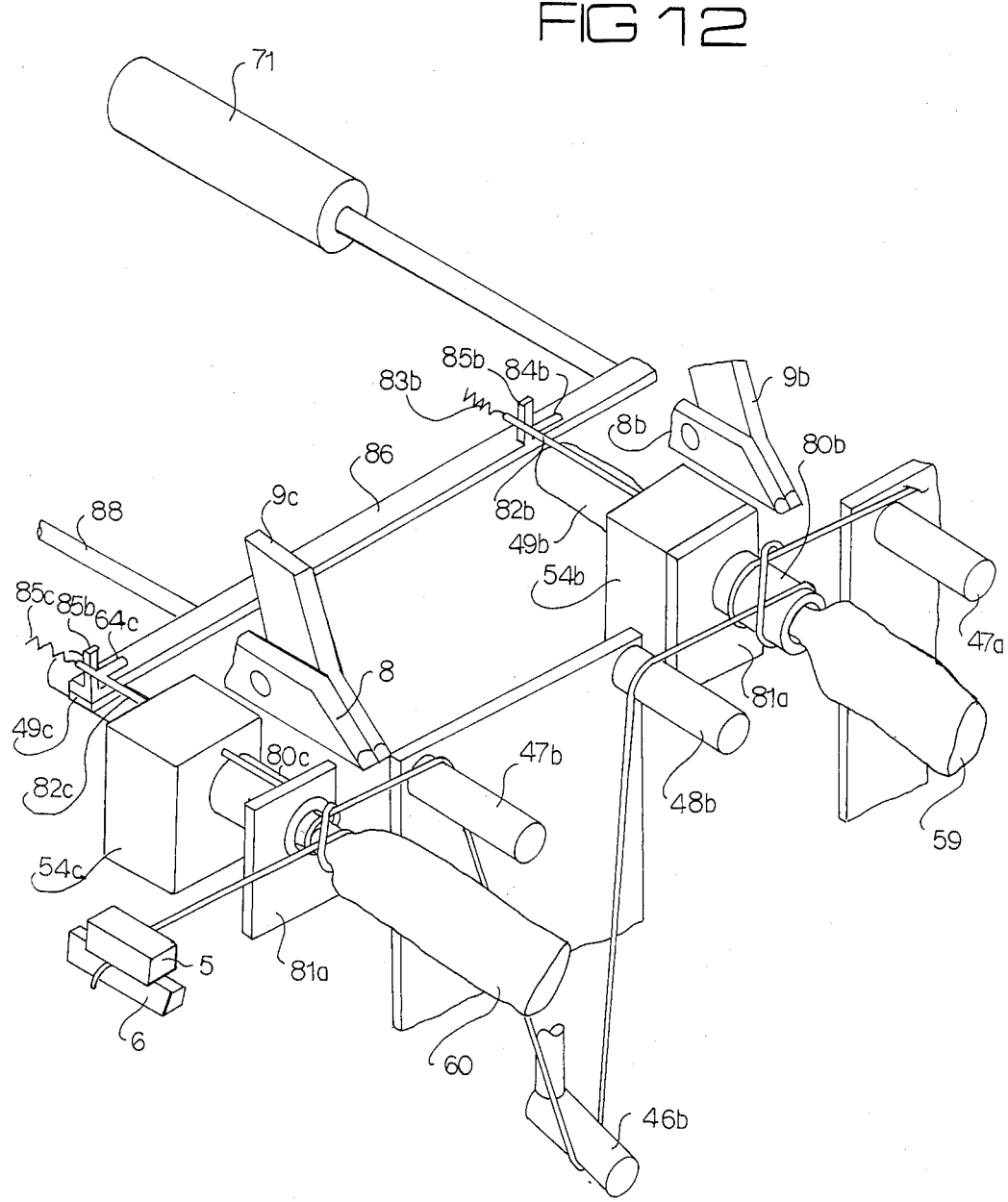
FIG. 12 is a large-scale part view showing the knot placement and tightening sequence.

Alternative arrangements for some of the mechanisms described above have been illustrated. These options are incorporated into the process control system of the machine, and relate in particular to the knot-placement mechanism and also to the thread tensioning and distribution mechanism for tightening the ties over the ends of the products being tied. In FIGS. 10, 11 and 12, the items identical to those described above are given identical references. For example, one mechanism for one tying station is illustrated. It is clear that it is necessary to multiple this number by the number of stations required. The station described below is the third, and the corresponding references include the letter c, in the same way as the letters a and b would be used to refer to the other two stations.

FIG. 11 illustrates a considerable modified version of the knot placement mechanism, which is particularly suitable for handling products of small dimensions, without excluding the others. To avoid the tendency for the knot, previously set up on the grab body, to enter the stripper block (54a, 54b or 54c) when the grab retracts, thereby adversely affecting the knot tightening phase, an alternative construction has been provided. The stripper block (54) incorporates an additional pin or sleeve (80c) mounted in a perpendicular and horizontal plane relative to the block inside which the pick-up grab (49) slides. This sleeve (80c) is arranged horizontally in the plane of the grab to facilitate movement of the latter. In addition, the said stripper block is fitted on its front outside face with a stripper plate (81c) surrounding the abovementioned sleeve. This plate is associated with a rod (82c) mounted at the rear, the latter being guided by the vertical support (51c). The rear end of the said rod is integral with a spring (83c) in the same axial plane which is itself fixed to the frame (1a). An important feature here is that the said rod (82c) incorporates a stop pin (84c) at the rear end; this pin bears on a vertical stop (85c) itself mounted on a horizontal support plate (86). As seen in FIG. 11, the said plate (86) is held and guided as it moves by cylindrical rods (87-88) sliding respectively in elongated pins (89-90) associated with the frame (1a).

FIGS. 11 and 12 illustrate the knot placement sequence based on the equipment shown in FIG. 10. As can be seen, the knot is formed directly around each of the sleeves (80c, 80a, 80b) on the tie-form mechanisms, and not on the grabs (49) as above. During the knot placement phase effected by simultaneous action of the stripper blocks (54), tensioners (30) and (36c), the pick-up grab (49) draws the empty part of the product inside the sleeves (80a, 80b, 80c), the cylinder (57) drives the stripper block (54) back, together with its integral sleeve (80). The stripper plate, initially bearing against the said block (54) detached from the block by virtue of the backward movement of the block and by the fact that its position is fixed by the forward pressure of the bar (86) on which the stops (85a) (85b) (85c) bear on the stop pins (84a, 84b, 84c). The said bar (86) has been initially moved forward by cylinder (91).

In theses conditions, the stripper plate (81c) slides along the sleeve (80c) which moves back, and pushes the preformed knot onto the products to be tied.

Simultaneously with this action, the mobile pin (46a, 46b, 46c) on the additional tightening device is moved by its cylinder, and the combined effect of the pins (46, 47, 48) tightens the knot in a secure and durable manner. It should be noted that the finger (9) on the following knotting system for formation of another tie pivots in the manner described previously, which completes the placement of the knot on the next sleeve (80) which acts in a similar manner.

On completion of all knotting operations, the different grabs (49) situated inside or behind the sleeves open and release the tied products. The cylinder (91) is actuated to retract, bringing with it the support plate (86). The vertical stops (85a, 85b, 85c) are thus disengaged from the stop pins (84a, 84b, 84c) and the rods (82a, 82b, 82c) return to their initial position under the effect of the return springs (83a, 83b, 83c) thereby applying the stripper plates (81a, 81b, 81c) against the face of each of the stripper blocks (54).

It is important to note the advantages of this mode of construction for the placement of knots. The knots are placed in a highly precise and efficient manner at a point closest to the filled portion of the product being tied, thereby ensuring perfect presentation of the product and secure retention of the contents.

In addition, FIG. 11 illustrates a variant of the thread tensioning and distribution mechanism which permits doubling of the thread retraction speed and a reduction of the cycle time. Thus, compared with the constructions shown in FIG. 1, the mobile and fixed tension units are duplicated. The fixed elements (37a,37b,37c) on the frame have been doubled to give (37a1-37a2) (37b1-37b2) (37c1-37c2). One fixed position tensioner (37d) has been added and located near the thread feeding mechanism. The mobile tension elements (34a, 34b, 34c) have been duplicated to give (34a1-34a2) (34b1-34b2) (34c1-34c2). These mobile elements are connected in pairs by means of rods (35a1-35a2) - (35b1-35b2)- (35c1-35c2) and connector bars (36a2-36b2-36c2) to the actuating cylinders (36a1-36b1-36c1). The mobile tension element (28) has also been duplicated to give (28a-28b). The mobile tensioners are thus attached in pairs to the same cylinder which is increased in diameter to provide the same capacity, but with a travel limited by two.

The principle of operation of the thread tensioner and distribution mechanism is the same as that described above.

The advantages are clearly attributable to the invention. Note in particular the full automation of the machine which executes several ties simultaneously in a sequenced operation during tie formation. It is thus possible to make strings of products with a variable number of links in each string. It is simply necessary to provide the mobile tensioners and additional knot-tightening devices in relation to the number of ties to be made.

The invention is in no way limited to any one of the modes of application described, nor to any one of the modes of construction of the various parts which have been specifically referred to: the invention encompasses all variants.

What is claimed is:

1. Improvements to automatic machines for tying various types of sausages and related products by means of thread, string or similar material, of the type incorporating at least the following features:
   a mechanism controlling the feed and distribution of thread,
   a mechanism for tensioning the thread and delivering it to the lacing zone on a controlled rectilinear path to facilitate tie formation,
   a mechanism for the production of pre-formed ties by a series of deflections of the thread path in several directions relative to the initial rectilinear path, for the purposes of tying the products with a knot referred to as a 'capstan' knot, a mechanism designed to pick up and position the product within the tying zone by means of a controlled movement perpendicular to the initial rectilinear trajectory of the thread, a mechanism for placement of the tie on the product, a mechanism for tightening the knot after the tie has been placed on the product;

the said machine being characterised by the fact that it incorporates facilities, mounted on a suitably constructed baseframe, for simultaneous formation of "n" ties on continuously-fed products by means of a number of devices corresponding to the number of ties to be made, the formation of ties and their placement on the products being effected in a pre-determined cycle in a sequential manner, taking each tie in turn, thread feed control mechanisms, thread tensioning mechanisms, additional knot-tightening mechanisms, thread presentation mechanisms, particular arrangements for deflection of the thread trajectory at the knotting heads, features for combined and individual control of the various mechanisms for tie formation and movement of the product-handling devices, the abovementioned features and mechanisms providing fully automated fabrication of "n" ties on the abovementioned products.

2. Machine as claimed in claim 1, characterised by the fact that it incorporates a frame (1) of which the various parts provide support or guidance for the mechanisms in the horizontal, vertical, lateral, extended or retracted positions, and the referenced 1a-1b-1c-1d-1e-1f-1g-1h-1i-1j-1k-1l-1m, ensuring that, after positioning of the various mechanisms and devices, the tying thread assumed a rectilinear trajectory.

3. Thread-clamping mechanism as claimed in claims 1 or 2, wherein it incorporates features which impart a traversing and vertical movement to the mechanism, the vertical movement facilitating alignment of the thread relative to the generatrix line of knot-tying zone, and the traversing movement directing the thread in front of the knotting heads.

4. Mechanism as claimed in claims 1 or 2, wherein the fingers (9a) to (9(n-a) have three positions and the fingers (9n) has two positions.

5. Machine as claimed in claims 1 or 2, wherein it incorporates additional knot-tightening mechanisms at least equal in number to the number of knotting heads, each mechanism incorporating devices mounted on a vertical support (100a-100b) with two fixed pins (47a-48a) and (47b-48b) situated on either side of the vertical axis of the support, these pins being provided to return the thread, whilst a mobile pin (46a-46b) moves vertically in a slot formed in the corresponding support under the action of a suitable actuating device, thereby drawing the thread down and over the fixed pins.

6. Thread feeding and tightening mechanism for the machine as claimed in claim 1, wherein it incorporates a vertically mobile plate (40) attached to a support plate (39) and having a particular profile (40-1) at the lower end located between two return rollers (38-1) (38-2) of different cross-section fixed to the frame, which impart a certain trajectory to the thread, the position of the said plate in relation to the return rollers facilitating slippage or braking and clamping of the thread.

7. Machine as claimed in claim 1, wherein it incorporates a thread tensioning and distribution mechanism located between the thread-feed device and the device which directs the thread in front of the knotting heads; the said tensioning mechanism being distinguished by the fact that it incorporates fixed and mobile elements, the number of fixed elements (n) being equal to the number of knotting heads and the number of mobile elements being equal to (n+1); the said elements serve to control the thread movement during the formation of each tie or knot, and to tighten the knots in conjunction with the other devices at the appropriate moment.

8. Tension mechanism as claimed in claim 7, wherein the mobile elements (28) (34a-34b-34c) and the fixed elements (37a-37b-37c) are arranged in a suitable manner on the frame walls, the mobile elements being located beneath the fixed elements with a gap between them to facilitate the insertion of the mobile elements between the fixed elements in the raised position, the thread being guided alternatively between the said elements.

9. Tensioning mechanism as claimed in claim 8, wherein the fixed elements and mobile elements are duplicated, the said mobile elements being connected in pairs via rods and link bars to cylinder type actuators.

10. Tensioning mechanism as claimed in claim 9, wherein the fixed elements are duplicated (37a1-37a2) (37b1-37b2) (37c1-37c2) and including an additional fixed element (37d) located near the thread feed mechanism, and also by the fact that the mobile elements are duplicated (28a-28b) (35a1-35a2) (35b1-35b2) (35c1-35c2).

11. Tensioning machine as claimed in claim 8, wherein the fixed tensioning elements (37a-37b-37c) and the mobile tensioning elements (34a-34b-34c), in the single or double configuration, are constructed in the form of a housing in which the apertures face upwards and downwards respectively and are designed to accommodate an idler pulley (70) of which the cheeks are conveniently set into recesses in the housing end plates to hold the thread perfectly secure; the top of each tensioning element incorporates a device to prevent the thread from inadvertently running off, this device being located opposite a plate designed to facilitate entry of the thread.

12. Tensioning mechanism as claimed in claim 8, wherein the additional mobile tensioner (28) performs another function, i.e. that of directing the thread towards the second thread-tightening mechanism, and incorporates a square extension piece (32) which slides along a vertical slot (33) in the frame support (1c) when the said tensioner moves, and the position of this lug facilitates alignment of the thread on the knotting head axis.

13. Tie-forming mechanism as claimed in claim 1 of the type incorporating fingers designed to modify the path of the thread in an upward direction, hooks designed to modify the thread path in a downward direction, and lateral spacing blades, the said fingers, hooks or blades being connected to actuating devices providing for their movement, the said mechanism being characterised by the fact that the fingers (9a, 10a) (9b, 10b) (9c, 10c) are pivoted on support elements (8a, 8b, 8c) and have sloping and preferably cylindrical front profile; the fingers (10a, 10b, 10c, 9c) are operated in two positions: up and down; and the fingers (9a-9b) are operated in three positions: up, intermediate and down, the overall travel of the fingers (9a-9b) remaining the same.

14. Mechanism for picking up and holding the product and placing the thread on the product as claimed in claim 1, of the type incorporating, for each knotting head, a pick-up clamp, a stripper block inside which the said grab slides, pulling the attached product with it, characterised by the fact that the grab (49) incorporates a cylindrical body extending into a jaw (49a); an aperture (49b) is provided transversely in the cylindrical body of the clamp and this aperture accommodates a pivoted arm or jaw (50); this jaw is pivoted centrally on the body and is connected at the extended rear end to an actuator device for opening and closing; the tying thread is placed on the cylindrical body of the said grab and then drops over the end of the product to be tied when the grab is withdrawn under the counteracting force of the stripper block.

15. Mechanism for picking up and holding the product and placing the thread on the product to be tied, as claimed in claim 1, of the type incorporating for each knotting head one pick-up grab and one stripper block inside which the said grab slides with the product attached, characterised by the fact that the stripped block (54) incorporates a sleeve (80c) in a perpendicular and horizontal plane, inside which the pick-up grab slides; the said block being fitted on its outside front surface with a stripper plate (81c) surrounding the said sleeve and associated with an actuating device which provides for ejection and placement of the thread from the sleeve onto the end of the product to be tied.

16. Mechanism as claimed in claim 1, wherein the actuating device for the stripper plate (81c) is a rod incorporating a return spring at one end, the said spring incorporates a stop device (84c) acting in conjunction with an additional stop mounted on a support plate (86) which is itself actuated by a device (91) during the operating cycle of the machine for the purposes of tie placement.

* * * * *